(12) United States Patent
Cimpu et al.

(10) Patent No.: US 9,723,616 B2
(45) Date of Patent: Aug. 1, 2017

(54) PREDICTABLE SCHEDULER FOR INTERFERENCE MITIGATION

(71) Applicant: Telefonaktiebolaget L M Ericsson (Publ), Stockholm (SE)

(72) Inventors: Virgil Cimpu, Ottawa (CA); Michael Petras, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 120 days.

(21) Appl. No.: 13/938,999

(22) Filed: Jul. 10, 2013

(65) Prior Publication Data

US 2015/0016348 A1    Jan. 15, 2015

(51) Int. Cl.
| | |
|---|---|
| *H04W 72/08* | (2009.01) |
| *H04W 52/36* | (2009.01) |
| *H04W 72/04* | (2009.01) |
| *H04W 52/24* | (2009.01) |
| *H04L 5/00* | (2006.01) |

(52) U.S. Cl.
CPC ....... *H04W 72/082* (2013.01); *H04W 52/244* (2013.01); *H04W 52/367* (2013.01); *H04L 5/0048* (2013.01); *H04L 5/0073* (2013.01); *H04W 52/241* (2013.01); *H04W 72/0473* (2013.01)

(58) Field of Classification Search
CPC ........... H04W 52/367; H04W 72/0446; H04W 72/0473; H04W 72/082
See application file for complete search history.

(56) References Cited

U.S. PATENT DOCUMENTS

| | | | |
|---|---|---|---|
| 2012/0142356 A1* | 6/2012 | Serravalle et al. | 455/436 |
| 2012/0165032 A1* | 6/2012 | Park et al. | 455/452.1 |
| 2013/0070719 A1* | 3/2013 | Xu et al. | 370/329 |
| 2013/0121191 A1 | 5/2013 | Song et al. | |
| 2013/0170376 A1* | 7/2013 | Dinan | H04W 72/12 370/252 |
| 2013/0217402 A1* | 8/2013 | Lin | 455/450 |
| 2013/0244709 A1* | 9/2013 | Davydov | H04W 52/0235 455/501 |
| 2013/0250882 A1* | 9/2013 | Dinan | 370/329 |

(Continued)

FOREIGN PATENT DOCUMENTS

| | | | |
|---|---|---|---|
| WO | 2011087252 A2 | 7/2011 | |
| WO | WO 2011150836 A1 * | 12/2011 | |

(Continued)

OTHER PUBLICATIONS

Fig. 9 of Gao, U.S. Appl. No. 13/532,401, submitted on Jun. 24, 2012.*

(Continued)

Primary Examiner — Benjamin Lamont
(74) Attorney, Agent, or Firm — Christopher & Weisberg, P.A.

(57) ABSTRACT

A method and apparatus assigning Physical Resource Blocks, PRBs, to a User Equipment, UE, in a wireless communication network having a plurality of cells, includes determining a Physical Cell Identifier, PCI, of a cell from the plurality of cells. Selecting a power level pattern of multiple PRBs for allocation, and assigning at least one of the multiple PRBs to the UE.

19 Claims, 7 Drawing Sheets

(56) References Cited

U.S. PATENT DOCUMENTS

| | | | |
|---|---|---|---|
| 2013/0343291 A1* | 12/2013 | Gao | H04W 52/244 370/329 |
| 2014/0024388 A1* | 1/2014 | Earnshaw et al. | 455/452.2 |
| 2014/0241276 A1* | 8/2014 | Berberana | H04W 72/082 370/329 |
| 2014/0247778 A1* | 9/2014 | Gomadam | H04L 5/0094 370/329 |
| 2014/0256336 A1* | 9/2014 | Manssour | H04L 1/0026 455/450 |
| 2014/0321406 A1* | 10/2014 | Marinier et al. | 370/329 |
| 2015/0139004 A1* | 5/2015 | Fodor | H04W 72/082 370/252 |
| 2015/0146638 A1* | 5/2015 | Ohwatari | H04W 52/143 370/329 |
| 2015/0264652 A1* | 9/2015 | Zhang | H04W 52/143 455/522 |
| 2016/0044681 A1* | 2/2016 | Zhou | H04L 5/0051 370/329 |
| 2016/0135194 A1* | 5/2016 | Kim | H04L 5/0048 370/329 |

FOREIGN PATENT DOCUMENTS

| | | |
|---|---|---|
| WO | 2012064589 A1 | 5/2012 |
| WO | 2012064593 A1 | 5/2012 |
| WO | 2013025160 A1 | 2/2013 |

OTHER PUBLICATIONS

3GPP TSG_RAN WG1 #69 R1-122828, Conference in Prague, Czech Republic, May 21-25, 2012, Source: Ericsson, ST-Ericsson Title: "On signalling support for reduced power ABS" Agenda Item 7.3.1 Document for Discussion and Decision consisting of 3-pages.
3GPP TSG-RAN WG1#70 R1-123267 Conference in Qingdao, China, Aug. 13-17, 2012 Source: Ericsson, ST-Ericsson Title: On signalling support for non-zero transmit power ABS Agenda Item: 7.3.1 Document for Discussion and Decision consisting of 4-pages.
3GPP TS 36.201 ETSI TS 136 201 V8.3.0 Release 8LTE; Evolved Universal Terrestrial Radio Access (E-UTRA); Long Term Evolution (LTE) physical layer; General description (Apr. 2009) consisting of 15-pages.
3GPP_TS 36_211_v08090 ETSI TS 136 211 V8.9.0 LTE; Evolved Universal Terrestrial Radio Access (E-UTRA); Physical channels and modulation (Jan. 2010) consisting of 85-pages.
3GPP_TS_136_213 v08080 ETSI TS 136 213 V8.8.0 LTE; Evolved Universal Terrestrial Radio Access (E-UTRA); Physical layer procedures (Oct. 2009) consisting of 79-pages.
3GPP_TS_36_214_v08070 ETSI TS 136 214 V8.7.0 LTE; Evolved Universal Terrestrial Radio Access (E-UTRA); Physical layer—Measurements (Oct. 2009) consisting of 14-pages.
J. Salo et al., "Practical Introduction to LTE for Radio Planners," dated Feb. 23, 2010 consisting of 13-pages.
Mohamed Salah, "Comparative Performance Study of the LTE Uplink Schedulers," Thesis submitted to the Department of Electrical and Computer Engineering in conformity with the requirements for the degree of Masters of Applied Science, Queen's University, Kingston, Ontario, Canada (Apr. 2011) consisting of 134-pages.
3GPP TSG_RAN WG1 #68 R1-121188, Conference in Jeju, Korea, Mar. 26-30, 2012, Source: Fujitsu Title: "CSI-RS Patterns for Interference Measurements for CoMP" Agenda Item 7.5.2 Document for Discussion and Decision consisting of 10-pages.
3GPP Draft; 55-090009, NGMN Recommendation on SON & O&M Requirements, a Requirement Specification by NGMN Alliance, dated Dec. 5, 2008, Version 1.23, Document Type: Working Document, Confidentiality Class: P—Public consisting of 40-pages.
Partial European Search Report dated Nov. 17, 2014 for European Serial No: 14002212.0-1857 consisting of 7-pages.
3GPP TSG RAN WG1 #63bis, R1-110095, Title: CSI Measurement Issue for Macro-Femto Scenarios, Agenda Item: 12.6, Source: Samsung, Document for Discussion and Decision, Conference Location and Date: Dublin, Ireland, Jan. 17-21, 2011 consisting of 4-pages.
3GPP TSG-RAN WG1 Meeting #68, R1-120241, Title: "Specification Impact of Non-Zero Power ABS," Agenda Item: 1.3.1., Source: Hitachi Ltd., Document for Discussion and Decision, Conference Location and Date: Dresden, Germany, Feb. 6-10, 2012 consisting of 3-pages.
Extended European Search Report dated Mar. 4, 2015 for European Serial No. 1 400 2212.0-1857 consisting of 14-pages.
European First Examination Report dated Dec. 1, 2016 for European Serial No. 1 400 2212.0-1857 consisting of 5-pages.

* cited by examiner

PREDICTABLE SCHEDULER FOR INTERFERENCE MITIGATION

CROSS-REFERENCE TO RELATED APPLICATIONS

Not applicable.

TECHNICAL FIELD

The present invention relates to wireless communication networks, and in particular to methods and apparatus providing a predictable scheduler for wireless communication interference mitigation.

BACKGROUND

Wireless communication technologies such as long-term evolution (LTE), which is a 4th Generation Radio Access Technology, have enabled mobile broadband to become a reality. The increased demand for high data rates is pushing operators for a densification of the macro cell layer as well as the introduction of heterogeneous networks with the addition of a small cell layer using the same frequency as the macro layer. This may lead to increased interference between cells both inside the macro and small cell layers, as well as interference between layers. And with the densification of the macro cell layer and the introduction of the small cell layer, the interference between cells and between users is increased significantly and threatens to limit the user throughput that can be achieved when adding new network equipment.

Some solutions include using different carrier frequencies for the macro layer and the small cell layer, but this drives up costs for operators having to purchase additional wireless communication network bandwidth, i.e., frequency spectrum.

Another solution is resource partitioning between cells. In the time domain, an Almost Blank Subframe (ABS) feature introduces protected subframes where the macro cell does not transmit data and hence allows smaller cells the opportunity to transmit data with little interference, allowing higher modulation levels for greater throughput. ABS, however, reduces the data throughput available by macro cell users.

In the frequency domain, carrier aggregation (CA) allows small cells and macro cells to transmit control signals on different frequencies and use the combined aggregate spectrum for greater throughput. CA, however, relies on an operator having access to multiple carriers.

Inter-cell interference coordination (ICIC) can also be used to limit interference between cells but requires communication between base stations. ICIC includes granular control of channel conditions for user data elements.

User data in a communication network may be grouped into elements referred to as a Physical Resource Block (PRB), which is a segment of both the frequency spectrum and time domain. Although a resource element (RE), which is comprised of a single symbol that is modulated on a single subcarrier (e.g., an LTE symbol is 71.9 µs in length modulated on 15 kHz), is the most granular element in the communication network, network components generally contend with larger collections of REs that span multiple symbols and multiple subcarriers. The PRBs define such larger collections of REs.

A first cell may transmit user data in a PRB at the same time a neighboring second cell transmits user data in the same PRB, which is the exact same set of subcarriers and symbols (time slots). The simultaneous transmission may cause interference between the neighboring cells because the two cells are competing for usage of the same physical resource.

Communication between base stations implementing ICIC allows the base stations to signal between the cells and schedule channel conditions in the cells to avoid such competition for resources and thus, attain higher spectral efficiency. However, ICIC requires constant communication between cells to manage such coordination between cells, and thus, uses a portion of the communication network bandwidth. As such, conventional solutions do not provide a capability of predictably scheduling different power levels for PRBs in a cell.

SUMMARY

The present invention relates to predictable scheduling for interference mitigation in wireless communication networks. In accordance with one embodiment, a method for assigning Physical Resource Blocks, PRBs, to a User Equipment, UE, in a wireless communication network having a plurality of cells, includes determining a Physical Cell Identifier, PCI, of a cell from the plurality of cells. A power level pattern of multiple PRBs for allocation is selected. At least one of the multiple PRBs is assigned to the UE.

In accordance with an aspect of this embodiment, the power level pattern of the plurality of PRBs is selected based on the PCI. In accordance with another aspect of this embodiment, the method includes determining an Automatic Neighbor Relations, ANR, list. The ANR list includes an interference level of each neighbor of the ANR list, and the assigning the at least one of the plurality of PRBs to the UE is configured to avoid interference with a neighboring cell. In accordance with yet another aspect of this embodiment, the method includes querying the UE for neighbor information. In accordance with still another aspect of this embodiment, the method further includes receiving information from the UE. The information from the UE includes one of a Channel Quality Indicator, CQI, and UE capability information, wherein the PRB is assigned to the UE based on the received information. In accordance with an aspect of this embodiment, the UE capability information includes one of a number of receiving antennas, UE cancellation features, a modulation and coding scheme and a retransmission scheme. In accordance with another aspect of this embodiment, the method includes determining a channel quality of the UE. If the channel quality is at least a threshold quality, the method includes assigning a PRB having a first power level to the UE, and if the channel quality is below the threshold quality, the method includes assigning a PRB having a second power level to the UE, wherein the second power level is higher than the first power level. In accordance with yet another aspect of this embodiment, the method includes defining a group of subframes, wherein the group of subframes includes at least two consecutive subframes, and assigning a PRB power level of one of the at least two consecutive subframes to all the subframes of the group of subframes. In accordance with still another aspect of this embodiment, if the cell is transmitting one of a Cell-specific Reference Signal, CRS, a Primary Synchronization Signal, PSS, and a Secondary Synchronization Signal, SSS, the assigned PRB is set to a maximum power level.

In accordance with another embodiment, a method for assigning Physical Resource Blocks, PRBs to a User Equipment, UE, in a wireless communication network including a cluster of neighboring cells, includes designating one cell of the cluster of neighboring cells as an arbitrator and defining, by the designated one cell, a set of power level patterns of multiple PRBs for all cells of the cluster of neighboring cells.

In accordance with an aspect of this embodiment, the method includes determining a Physical Cell Identifier, PCI, of the cell, wherein the power level pattern for the cell is defined based on the PCI of the cell. In accordance with another aspect of this embodiment, the method includes assigning at least one of the multiple PRBs to the UE. In accordance with still another aspect of this embodiment, the method includes receiving an expected cell load in k succeeding Transmission Time Intervals, TTIs of the cell, wherein k is an integer greater than 1, and wherein defining the power level pattern includes defining the power level pattern for the k succeeding TTIs of the cell. In accordance with yet another aspect of this embodiment, the method includes allocating a first number of highest power level PRBs to a first cell, and allocating a second number of highest power level PRBs to a second cell, the first number being greater than the second number if the first cell is busier than the second cell. In accordance with another aspect of this embodiment, the method includes multicasting the defined power level pattern to a node serving the cell of the cluster.

In accordance with another embodiment, a node of a wireless communication network for assigning Physical Resource Blocks, PRBs, to a User Equipment, UE, in the wireless communication network is provided, in which the wireless communication network includes a plurality of cells, and the node includes a memory storing multiple power level patterns of multiple PRBs and a processor. The processor is configured to determine a Physical Cell Identifier, PCI, of a cell of the multiple cells, select a power level pattern of multiple PRBs for allocation, and assign at least one of the multiple PRBs to the UE.

In accordance with another aspect of this embodiment, the processor is further configured to determine an Automatic Neighbor Relations, ANR, list. The ANR list includes an interference level of each neighbor of the ANR list and assign the at least one of the plurality of PRBs to the UE to avoid interference with a neighboring cell. In accordance with still another aspect of this embodiment, the processor is further configured to query the UE for neighbor information. In accordance with yet another aspect of this embodiment, the node includes an interface configured to receive information from the UE. The information includes one of a Channel Quality Indicator, CQI, and UE capability information, wherein the PRB is assigned to the UE based on one of the CQI and the UE capability information. In accordance with another aspect of this embodiment, the UE capability information includes one of a number of receiving antennas, UE cancellation features, a modulation and coding scheme and a retransmission scheme.

In accordance with still another aspect of this embodiment, the node includes an interface configured to determine a channel quality of the UE and the processor is further configured to assign a PRB having a first power level to the UE if the channel quality is above a threshold quality and assign a PRB having a second power level to the UE if the channel quality is below the threshold quality. The second power level is higher than the first power level. In accordance with yet another aspect of this embodiment, the processor is further configured to define a group of subframes. The group of subframes includes at least two consecutive subframes. In accordance with another aspect of this embodiment, the processor is further configured to define a group of PRBs, the group of PRBs including at least two consecutive PRBs, a size of the group of PRBs being equal to a Resource Block Group, RBG, subset size; and assign a power level of one of the at least two consecutive PRBs to the group of PRBs.

DETAILED DESCRIPTION

Before describing in detail exemplary embodiments that are in accordance with the present invention, it is noted that the embodiments reside primarily in combinations of apparatus components and processing steps related to a predictable scheduler for interference mitigation in a wireless communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, the joining term, "in communication with" and "connected to," and the like, may be used to indicate electrical or data communication, which may be accomplished by physical contact, induction, electromagnetic radiation, radio signaling, infrared signaling or optical signaling, for example. The above methods of achieving electrical or data communication are non-limiting and mentioned only for illustration. One having ordinary skill in the art will appreciate that multiple components may interoperate and modifications and variations are possible of achieving the electrical and data communication.

Figure 1:
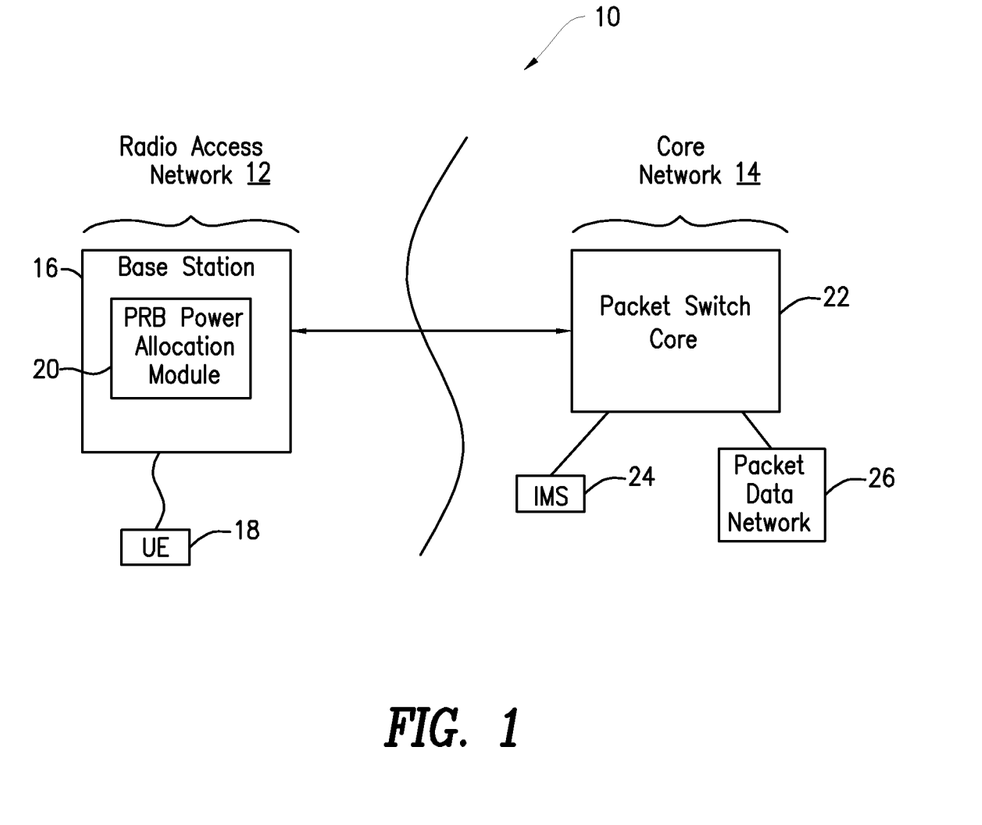
FIG. 1 is a block diagram of a communication system constructed in accordance with principles of the present invention.

Referring to the drawing figures in which like reference designators refer to like elements, FIG. 1 shows a block diagram of a communication system 10 according to an exemplary embodiment of the present invention. The communication system 10 includes a Radio Access Network (RAN) 12 and a Core Network (CN) 14. The RAN 12 includes a base station 16, which may include, for example, an evolved Node B (eNodeB). The base station 16 provides the air interface with the user equipment (UE) 18 and communicatively couples the UE 18 to CN 14. The base station 16 includes a physical resource block (PRB) power allocation module 20, which provides the power assignment and control logic for wireless communication from the base station 16 to UE 18. The base station 16 is in communication with a packet switch core 22 of the CN 14. The packet switch core 22 provides back-end switching for voice calls. The packet switch core 22 is in communication with an Internet Protocol multimedia service (IMS) 24, which provides the protocol for setting up and controlling calls or sessions between a UE 18 and a service provider, and a packet data network 26, which relays communications between the UE 18 and a destination.

Figure 2:
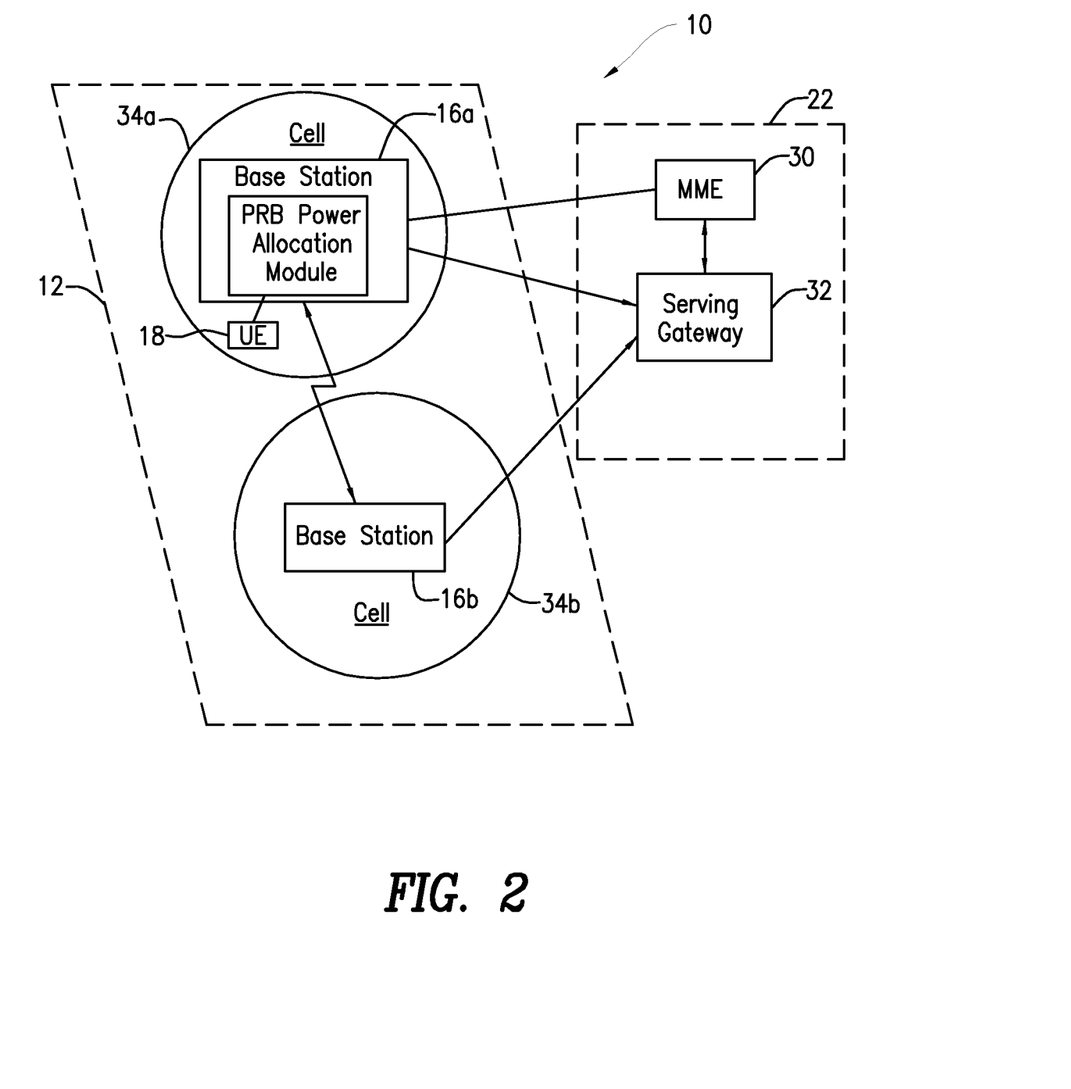
FIG. 2 is a detailed block diagram view of the wireless communication system constructed in accordance with the principles of the present invention.

A detailed exemplary block diagram of the wireless communication system 10 is described with reference to FIG. 2. The wireless communication system 10 includes a mobility management entity (MME) 30 in communication with a serving gateway 32. The MME 30 is the control node for the wireless communication system 10 and is responsible for bearer activities including, for example, bearer activation/deactivation, serving gateway selection for the UE 18 and user authentication. The serving gateway 32 is responsible for routing and forwarding user data packets to the base station 16. The MME 30 and the serving gateway 32 are in communication with a first base station 16a, which is spatially located in a first cell 34a that is served by the first base station 16a. The serving gateway 32 is also in communication with a second base station 16b, which is spatially located in a second cell 34b that is served by the second base station 16b. Of note, the first base station 16a and the second base station 16b are generally referred to collectively herein as "base station 16." Moreover, the first cell 34a and the second cell 34b are generally referred to herein as "cell 34." The first base station 16a is in communication with the second base station 16b. Each cell 34 includes a Physical Cell Identifier (PCI), which can have 504 distinct values, and is used by UE 18 for cell identification and channel synchronization.

Figure 3:
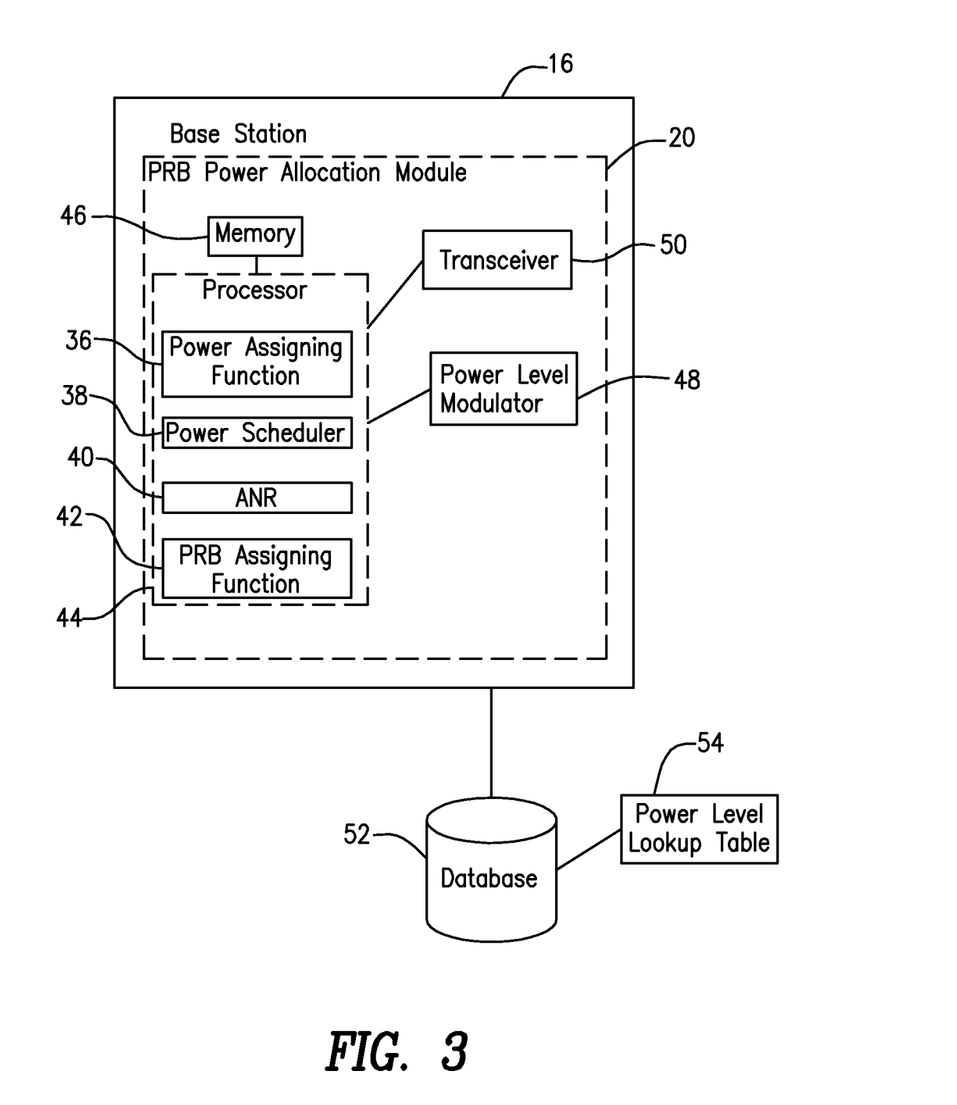
FIG. 3 is a block diagram of a base station in accordance with the principles of the present invention.

An exemplary block diagram of a base station 16 is described with reference to FIG. 3. The base station 16 includes a power assigning function 36, a power scheduler module 38, an automatic neighbor relations (ANR) module 40 and a PRB assigning function 42. The power assigning function 36 provides assignment and/or allocation of a power level to a PRB. The power level of the PRB refers to a transmission power, by the base station 16, for a corresponding time and frequency of the PRB. The time is a transmission time allocated to the PRB. The frequency is a portion of a frequency spectrum that is allocated (for modulation) on one or more carriers. According to some exemplary embodiments, in the time domain, a PRB is allocated ½ of a subframe, which is 1 ms in duration, and, in the frequency domain, exemplary embodiments of a PRB include 12 subcarriers. In exemplary embodiments, the power level assigned to a PRB is a maximum power level to be used for the PRB and a lower power level may be used if the maximum level is not required. The power level may itself may be a pre-defined as discrete levels and may be, for example, numerically represented as: 0 (the PRB should not be used), 1 (the PRB should be at most ¼ of a maximum power level), 2 (the PRB should be at most ½ of the maximum power level), and 3 (the PRB should be at most the maximum power level).

The power scheduler module 38 provides scheduling of a power level or a power level pattern to a future PRB or PRBs in, for example, a subset. The ANR module 40 facilitates execution of automatic neighbor relation functions for the base station 16. ANR refers to a feature of the communication network 10 whereby the base station 16 is automatically configured and integrated into the communication network 10. ANR allows a base station 16 to adjust technical parameters of the base station 16 to provide optimized coverage (in area, capacity, time and power usage) with neighboring base stations 16. According to some exemplary embodiments, ANR may include performing measurements on neighbor cells and maintaining lists, e.g., neighbor relations table (NRT), on neighboring cells. The PRB assigning function 42 performs assignment or allocation of a PRB to a UE 18. The power assigning function 36 assigns a corresponding power level to the assigned PRB.

One or more of the power assigning function 36, the power scheduler module 38, the ANR module 40 and the PRB assigning function 42 may be implemented, for example, in hardware on a processor 44 or as a combination of hardware and software. Programmatic code to implement aspects of the base station 16, including the functions of the processor 44 can be stored in memory 46. The base station 16 includes a power level modulator 48 in communication with the processor 44 and a transceiver 50. The power level modulator 48 modulates a power level of the transceiver 50 based on a control of the processor 44. The transceiver 50 includes a transmitter and receiver combined to share common circuitry. The transceiver 50 provides radio transmission and reception functionality between the base station 16 and the UE 18. Of note, it is contemplated that separate receivers and transmitters can be implemented. The above-described feature components of base station 16 may be collectively implemented as a PRB power allocation module 20.

The base station 16 is in communication with a database 52, which may be accessible by other base stations 16 in the RAN 12 and may be logically located in CN 14 in, for example, MME 30. The database 52 includes a power level lookup table 54, which includes a power level or a power level pattern that corresponds to an identifier key such as, for example, the PCI.

Figure 4:
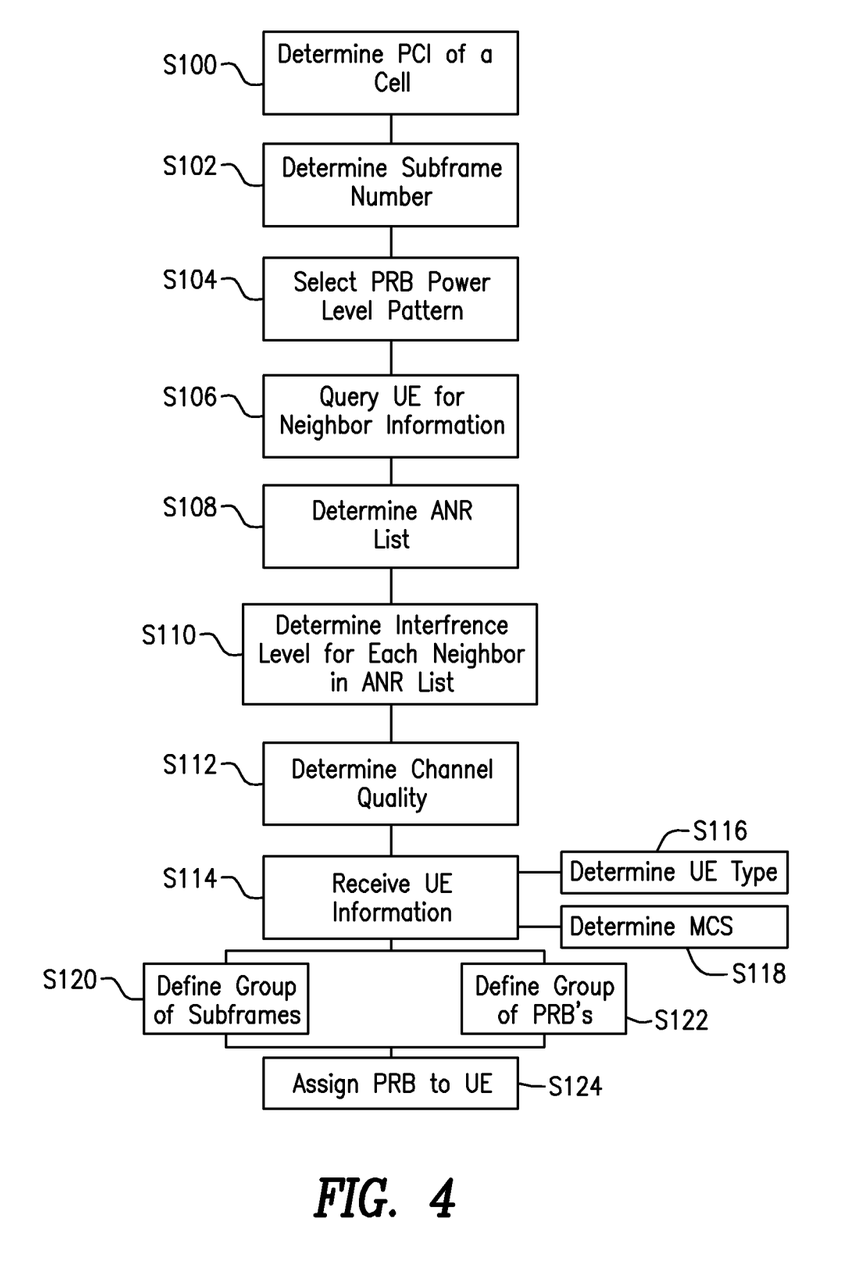
FIG. 4 is a flow chart of an exemplary process of assigning a Physical Resource Block (PRB) to a user equipment (UE) in accordance with principles of the present invention.

An exemplary flow chart of a process of assigning a PRB to a UE is described with reference to FIG. 4. The PRB power allocation module 20 determines the PCI of a cell (block S100). The PCI identifies the cell served by the base station 16, and, is not a globally unique identifier, but serves to differentiate the cell served by the base station 16 in a spatial or geographical region. Thus, when more than one cell shares a same PCI, the cells should not be geographically close to avoid interference with each other.

The PRB power allocation module 20 determines a subframe number (block S102) for a PRB. The subframe number is an integer that identifies a particular transmission time interval (TTI) in a transmission frame. According to some exemplary embodiments, each subframe includes two resource blocks, where each of the pair of resource blocks defines a PRB. The PRB power allocation module 20 selects a PRB power level pattern (block S104) for a PRB based on the PCI and subframe number. According to some exemplary embodiments, the PRB power level pattern may be selected for a number of consecutive PRBs. The PRB power level pattern is selected to minimize interference among neighbor cells.

The PRB power allocation module 20 queries the UE for neighbor information (block S106). The PRB power allocation module 20 determines an ANR list (block S108), which includes information on neighboring cells and/or neighboring base stations including, for example, a PCI of the neighboring cell, an evolved cell global identifier or cell global identifier (ECGI/CGI) and transmission frequencies. The PRB power allocation module 20 determines an interference level for each neighbor in the ANR list (block S110) and the PRB power allocation module 20 determines a channel quality (block S112) by, for example, a channel quality indicator (CQI). According to some exemplary embodiments, ANR 40 may be enhanced to provide an indication of interference level for each neighbor, and the ANR list may be sorted based on an interference level.

The PRB power allocation module 20 receives UE information (block S114), which may include a determination of a UE type (block S116) and a determination of a modulation and coding scheme (MCS) (block S118). According to some exemplary embodiments, UE information may include a number of receiving antennas and UE interference cancellation features such as Successive Interference Cancellation (SIC), for example. According to some exemplary embodiments, the UE information includes capabilities such as a hybrid automatic repeat request (HARQ) capability as well as the number of HARQ retransmissions.

The PRB power allocation module 20 defines a group of subframes (block S120) or a group of PRBs (block S122). The group of subframes or group of PRBs, which are defined by multiple subframes and multiple PRBs, respectively, may be assigned, for example, a single power level that is used by all the subframes or PRBs of the respective group in the event that a more granular assignment of power levels is not necessary. According to some exemplary embodiments, the size of the group of PRBs may match a Resource Block Group (RBG) used for resource allocation type 0 or a RBG subset size for resource allocation type 1. The PRB power allocation module 20 assigns a PRB, which has an assigned power level, to a UE 18 (block S124). According to some embodiments, a PRB is assigned to a UE 18 based on neighbor interference levels. Thus, in one embodiment, a PRB is assigned to a UE 18 to reduce interference between cells by assigning a low power PRB to a UE 18 having good channel quality and assigning a high power PRB to a UE 18 having poor channel quality. In some exemplary embodiments the channel quality may be compared against a threshold value and a PRB is assigned to the UE 18 based on the comparison. For example, if the channel quality is above the threshold value, a PRB having a low power level may be assigned to the UE 18, and if the channel quality is below the threshold value, a PRB having a relatively higher power level may be assigned to the UE 18.

Figure 5:
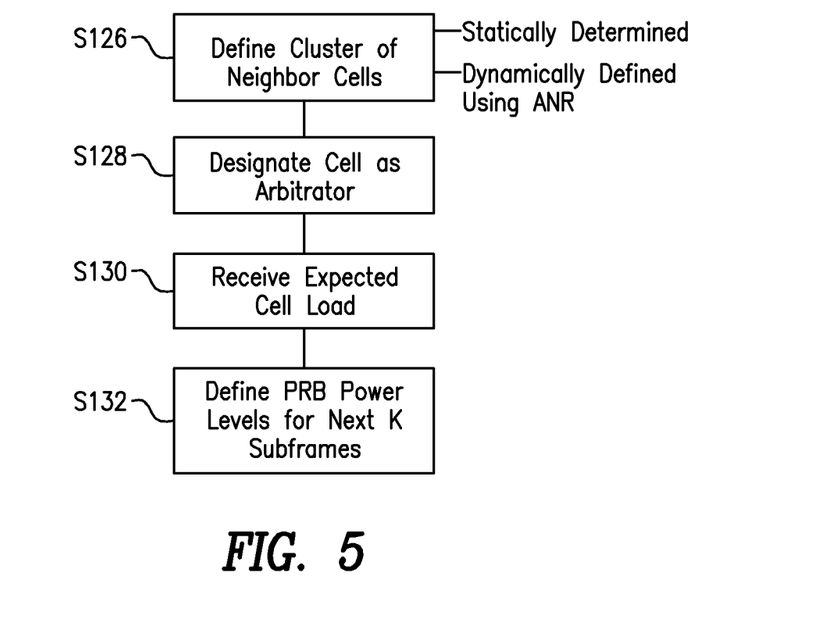
FIG. 5 is a flow chart of an exemplary process of defining PRB power levels for subframes in accordance with principles of the present invention.

An exemplary flow chart of a process of defining PRB power levels is described with reference to FIG. 5. The PRB power allocation module 20 defines or identifies a cluster of neighboring cells (block S126), which may be a statically defined cluster or a dynamically defined cluster using, for example, features of ANR. The PRB power allocation module 20 designates one cell 34 of the cluster of cells as an arbitrator (block S128). The PRB power allocation module 20 of the arbitrator receives an expected cell load (block S130) for a number, k, of succeeding subframes. The PRB power allocation module 20 defines the PRB power levels for the k succeeding subframes for each cell of the cluster of neighboring cells (block S132). The collaboration among the cluster of neighboring cells directed by the PRB power allocation module 20 of the arbitrator reduces the interference level among the cluster of neighboring cells by, for example, minimizing simultaneous high power transmissions for neighboring cells 34 of the cluster and allocating PRB power to accommodate the expected cell load.

Figure 6:
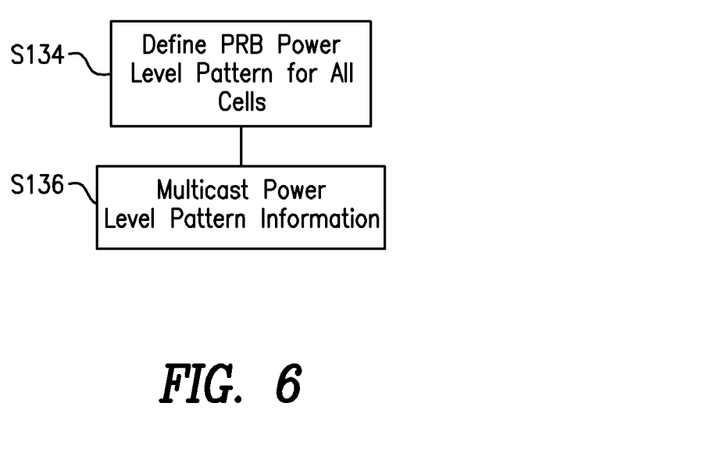
FIG. 6 is a flow chart of an exemplary process of communicating power level pattern information in accordance with principles of the present invention.

An exemplary flow chart of a process of defining the PRB power level pattern for all cells 34 in a cell cluster is described with reference to FIG. 6. The PRB power allocation module 20 of the arbitrator defines the PRB power level pattern for all cells in the cluster of cells (block S134). The arbitrator multicasts the power level information (block S136), which includes the PRB power level pattern, to the base stations 16 serving the cells of the cluster.

Figure 7:
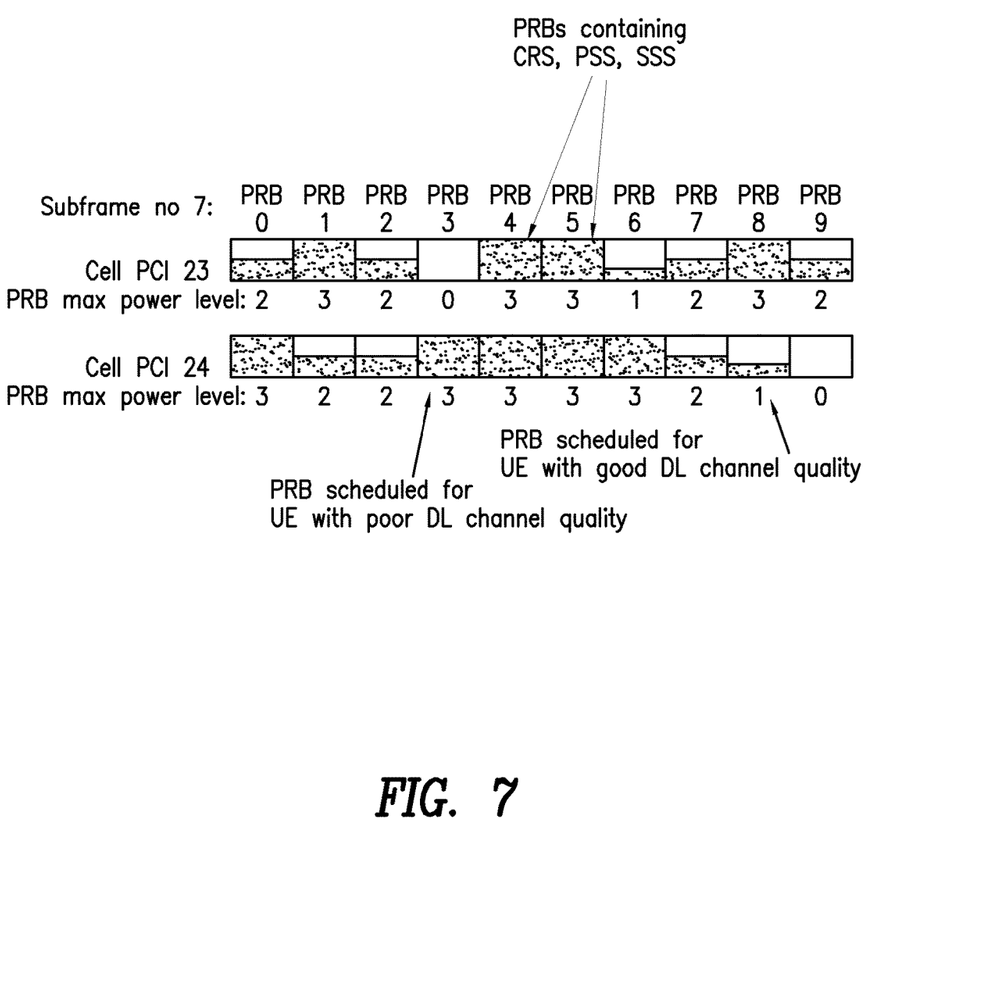
FIG. 7 is a block diagram of exemplary power levels assigned to PRBs of subframes for two different Physical Cell Identifiers (PCIs)

An exemplary block diagram representation of a power level pattern assigned to a subframe for two cell PCIs is described with reference to FIG. 7. FIG. 7 shows that a subframe (subframe 7) for cell PCIs 23 and 24 have 10 segments numbered from PRB0 . . . PRB9, which correspond to portions of a frequency spectrum. As described above, some exemplary embodiments, 12 subcarriers of the frequency spectrum correspond to a single PRB. Each of the subcarriers for the subframe is assigned a power level of 0, 1, 2 or 3, which respectively correspond (as previously described) to: (the PRB should not be used), (the PRB should be at most ¼ of a maximum power level), (the PRB should be at most ½ of the maximum power level), and (the PRB should be at most the maximum power level). The shading illustrates the assigned power level for the respective segment and PRB, which is also indicated by a number below each segment. Specific segments or PRBs where a cell must transmit certain signals such as cell-specific reference signals (CRS), primary and secondary synchronization signals (PSS and SSS) should always be set to maximum power. Referring again to FIG. 7, PRB4 and PRB5, for example, may be designated as containing CRS, PSS and SSS and thus, set at power level 3.

It should be appreciated that having a different power level pattern for subframe 7 for PCI 24 than for subframe 7 for PCI 23 reduces interference between cells (for example, if neighboring cells are PCI 23 and 24) by reducing simultaneous high power transmissions for the neighboring cells, which may cause inter-cell interference. As further illustration, PRB3 shows that a PRB assigned to a UE 18 having poor channel quality in cell PCI 24 is assigned full power and will not encounter interference from cell PCI 23 because the corresponding PRB in PCI 23 is assigned 0, or do not use. Additionally, PRB8 shows that a PRB assigned to a UE18 having good channel quality in PCI 24 is assigned 1, i.e., ¼ maximum power, and will likely not interfere with a UE 18 communicating in neighboring cell PCI 23, which assigned 4, i.e., full power. It will be appreciated that a different set of PRB power level patterns for neighboring cells is helpful for minimizing interference between the cells.

Figure 8:
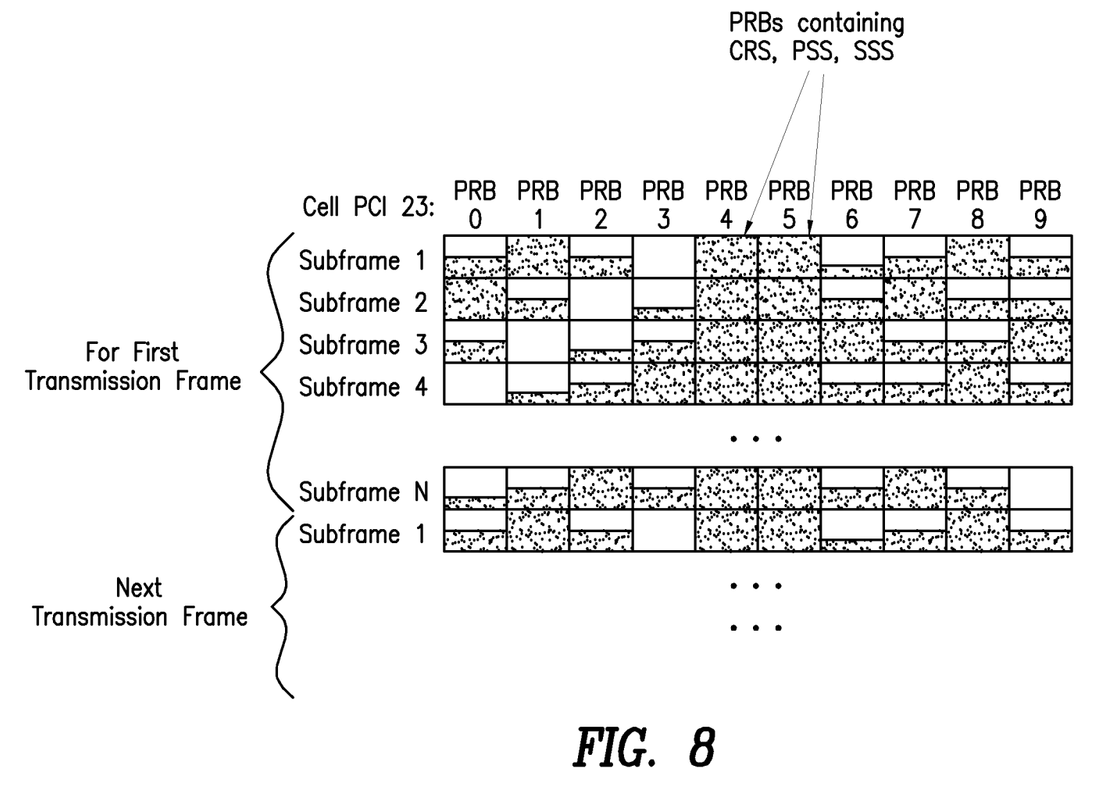
FIG. 8 is a block diagram of exemplary power levels assigned to PRBs of the subframes of a PCI.

An exemplary block diagram representation of a power level pattern assigned to a cell for multiple subframes is described with reference to FIG. 8. The power level pattern for cell PCI 23 is illustrated for subframes 1 through n. As in FIG. 7, the pattern has 10 segments numbered from PRB0 . . . PRB9. It will be appreciated that the PRB power levels shown for subframes 1 through n are applied for the first frame PRB0, then the PRB power levels may vary between subframes as shown for subframes 1 through n. It will be further appreciated that the power levels for the following frames is known because the pattern for PCI 23 repeats. As shown, the pattern applied to the first subframe 1 for the first transmission frame is identical to the pattern for the first subframe 1 of the next transmission frames. Thus, the power level pattern for any given subframe is known for the future transmission frames.

It will be further appreciated in some exemplary embodiments, that small cells may use patterns where most of the PRBs are at full power because the power level of the smaller cell is considerably lower than a larger macro cell. Furthermore, in some embodiments, a certain range of PCIs may be reserved for small cells such that the PRB power levels are set differently for small cells versus macro cells. Full power will not always be used for smaller cells, however to avoid interference between the smaller cells.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for assigning Physical Resource Blocks, PRBs, to a User Equipment, UE, in a wireless communication network having a plurality of cells, the method comprising:
   determining a Physical Cell Identifier, PCI, of a cell of the plurality of cells;
   selecting a predefined power level pattern based on the PCI of the cell, the predefined power level pattern being established by at least two power levels of a plurality of PRBs of a subframe in a first transmission frame and of a corresponding subframe in a second transmission frame for allocation, the first and second transmission frames being consecutive transmission frames; and
   assigning at least one of the plurality of PRBs of the subframe and corresponding subframe in the respective first and second consecutive transmission frames from the selected predefined power level pattern to the UE based on one of a number of receiving antennas of the UE and UE cancellation features.

2. The method according to claim 1, wherein the plurality of PRBs of the subframe in the first and second transmission frames including PRBs of the entire subframe in the first and second transmission frames.

3. The method according to claim 2, further comprising: determining an Automatic Neighbor Relations, ANR, list, the ANR list including an interference level of each neighbor of the ANR list, and the assigning the at least one of the plurality of PRBs to the UE is configured to avoid interference with a neighboring cell.

4. The method according to claim 1, further comprising querying the UE for neighbor information.

5. The method according to claim 1, further comprising: receiving information from the UE, the information including one of a Channel Quality Indicator, CQI, and UE capability information, wherein the PRB is assigned to the UE based on the received information.

6. The method according to claim 5, wherein the UE capability information includes one of a modulation and coding scheme and a retransmission scheme.

7. The method according to claim 1, further comprising: determining a channel quality of the UE;
   if the channel quality is at least a threshold quality, the assigned at least one of the plurality of PRBs having the first power level; and
   if the channel quality is below the threshold quality, the assigned at least one of the plurality of PRBs having the second power level, the second power level being higher than the first power level.

8. The method according to claim 1, further comprising: defining a group of subframes, the group of subframes including at least two consecutive subframes; and
   assigning a PRB power level of one of the at least two consecutive subframes to all the subframes of the group of subframes.

9. The method according to claim 1, further comprising: defining a group of PRBs, the group of PRBs including at least two consecutive PRBs, a size of the group of PRBs being equal to a Resource Block Group, RBG, subset size; and
   assigning a power level of one of the least two consecutive PRBs to the group of PRBs.

10. The method according to claim 1, wherein the assigned PRB is set to a maximum power level in response to determining that the cell is transmitting one of a Cell-specific Reference Signal, CRS, a Primary Synchronization Signal, PSS, and a Secondary Synchronization Signal, SSS.

11. A node of a wireless communication network for assigning Physical Resource Blocks, PRBs, to a User Equipment, UE, in the wireless communication network, the wireless communication network having a plurality of cells, the node comprising:
   a memory storing a plurality of power level patterns of a plurality of PRBs; and
   a processor configured to:
      determine a Physical Cell Identifier, PCI, of a cell of the plurality of cells;
      select a predefined power level pattern based on the PCI of the cell, the predefined power level pattern being established by at least two power levels of a plurality of PRBs of a subframe in a first transmission frame and of a corresponding subframe in a second transmission frame for allocation, the first and second transmission frames being consecutive transmission frames; and
      assign at least one of the plurality of PRBs of the subframe and corresponding subframe in the respective first and second transmission frames from the selected predefined power level pattern to the UE based on one of a number of receiving antennas of the UE and UE cancellation features.

12. The node of claim 11, wherein the plurality of PRBs of the subframe in the first and second transmission frames including PRBs of the entire subframe in the first and second transmission frames.

13. The node of claim 12, wherein the processor is further configured to:
  determine an Automatic Neighbor Relations, ANR, list, the ANR list including an interference level of each neighbor of the ANR list and assign the at least one of the plurality of PRBs to the UE to avoid interference with a neighboring cell.

14. The node of claim 11, the processor further configured to query the UE for neighbor information.

15. The node of claim 11, further comprising:
  an interface configured to:
  receive information from the UE, the information including one of a Channel Quality Indicator, CQI, and UE capability information, wherein the PRB is assigned to the UE based on one of the CQI and the UE capability information.

16. The node of claim 15, wherein the UE capability information includes one of a modulation and coding scheme and a retransmission scheme.

17. The node of claim 11, further comprising:
  an interface configured to:
  determine a channel quality of the UE; and
  if the channel quality is above a threshold quality, the assigned at least one of the plurality of PRBs having the first power level; and
  if the channel quality is below the threshold quality, the assigned at least one of the plurality of PRBs having the second power level, second power level being higher than the first power level.

18. The node of claim 11, wherein the processor is further configured to:
  define a group of subframes, the group of subframes including at least two consecutive subframes; and
  assign a PRB power level of one of the at least two consecutive subframes to all the subframes of the group of subframes.

19. The node of claim 11, wherein the processor is further configured to:
  define a group of PRBs, the group of PRBs including at least two consecutive PRBs, a size of the group of PRBs being equal to a Resource Block Group, RBG, subset size; and
  assign a power level of one of the at least two consecutive PRBs to the group of PRBs.

* * * * *